United States Patent
Bradley et al.

(10) Patent No.: US 10,507,346 B2
(45) Date of Patent: Dec. 17, 2019

(54) IMAGING SYSTEM FOR FIRE FIGHTING TRAINING

(71) Applicant: Lion Group, Inc., Dayton, OH (US)

(72) Inventors: Brian P. Bradley, Albany, NY (US); Michael P. Waterhouse, Voorheesville, NY (US); Daniel A. Goldman, Schenectady, NY (US)

(73) Assignee: LION GROUP, INC., Dayton, OH (US)

( * ) Notice: Subject to any disclaimer, the term of this patent is extended or adjusted under 35 U.S.C. 154(b) by 46 days.

(21) Appl. No.: 15/487,644

(22) Filed: Apr. 14, 2017

(65) Prior Publication Data

US 2017/0296854 A1 Oct. 19, 2017

Related U.S. Application Data

(60) Provisional application No. 62/323,270, filed on Apr. 15, 2016.

(51) Int. Cl.

| *G06F 3/14* | (2006.01) |
|---|---|
| *A62C 99/00* | (2010.01) |
| *H04N 5/33* | (2006.01) |
| *H04N 5/247* | (2006.01) |
| *G09B 19/00* | (2006.01) |

(52) U.S. Cl.
CPC ........ *A62C 99/0081* (2013.01); *G09B 19/003* (2013.01); *H04N 5/247* (2013.01); *H04N 5/33* (2013.01); *G06F 3/14* (2013.01)

(58) Field of Classification Search
CPC .. A62C 99/0081; G09B 19/003; H04N 5/247; H04N 5/33; G06F 3/14

USPC ......................................................... 348/158
See application file for complete search history.

(56) References Cited

U.S. PATENT DOCUMENTS

| 4,861,270 | A | 8/1989 | Ernst et al. |
| 6,349,001 | B1* | 2/2002 | Spitzer ................. G02B 27/017 |
| | | | 359/618 |
| 7,617,022 | B1 | 11/2009 | Wood et al. |
| 9,786,158 | B2* | 10/2017 | Beaver ................. G08B 29/185 |
| 9,900,478 | B2* | 2/2018 | Fox ....................... H04N 5/2252 |
| 9,973,692 | B2* | 5/2018 | Szabo ................ H04N 5/23238 |
| 9,986,175 | B2* | 5/2018 | Frank ................... H04N 5/2257 |
| 2002/0197591 | A1 | 12/2002 | Ebersole et al. |

(Continued)

FOREIGN PATENT DOCUMENTS

WO 2007/133209 11/2007

OTHER PUBLICATIONS

Fritsche et al, Fusion of radar, LiDAR and Thermal information for hazard detection in low visibility environments (Year: 2017).*

(Continued)

*Primary Examiner* — Shan E Elahi
(74) *Attorney, Agent, or Firm* — Thompson Hine LLP (57) ABSTRACT

A system including an imaging device having a first image capture device configured to detect longwave infrared electromagnetic radiation and a second image capture device configured to detect near infrared electromagnetic radiation. The system further includes a display configured to display a visible representation of the detected infrared longwave electromagnetic radiation and the detected near infrared electromagnetic radiation.

24 Claims, 6 Drawing Sheets

(56) References Cited

U.S. PATENT DOCUMENTS

| | | | |
|---|---|---|---|
| 2006/0049350 A1* | 3/2006 | Teich | G08B 13/19641 250/330 |
| 2006/0115121 A1* | 6/2006 | Saka | G06T 7/0002 382/104 |
| 2008/0099678 A1 | 5/2008 | Johnson et al. | |
| 2011/0002677 A1* | 1/2011 | Cochran | H05B 3/0057 392/416 |
| 2011/0069189 A1* | 3/2011 | Venkataraman | H01L 27/14618 348/218.1 |
| 2013/0230076 A1 | 9/2013 | Maggio et al. | |
| 2014/0253735 A1* | 9/2014 | Fox | H04N 5/2252 348/164 |
| 2015/0079558 A1 | 3/2015 | Blackburn et al. | |
| 2015/0097980 A1* | 4/2015 | Cucci | H04N 5/23206 348/211.2 |
| 2015/0160175 A1* | 6/2015 | Knox | G01N 21/49 340/630 |
| 2015/0172545 A1* | 6/2015 | Szabo | H04N 5/23238 348/36 |
| 2015/0288892 A1* | 10/2015 | Frank | H04N 5/2257 348/164 |
| 2015/0297949 A1* | 10/2015 | Aman | G06F 16/70 348/157 |

OTHER PUBLICATIONS

Yuanbin et al, Early fire detection for high space based on video image processing (Year: 2014).*

PCT, International Search Report and Written Opinion, International Application No. PCT/US2017/027530, 12 pages, dated Jun. 26, 2017.

* cited by examiner

FIG. 7

IMAGING SYSTEM FOR FIRE FIGHTING TRAINING

This application claims priority to U.S. Provisional Patent Application Ser. No. 62/323,270, entitled AUGMENTED REALITY THERMAL IMAGING SYSTEM FOR FIRE FIGHTER TRAINING filed on Apr. 15, 2016, the entire contents of which are hereby incorporated by reference.

This application is directed to an imaging system, and more particularly, to an imaging system for use in firefighting training.

BACKGROUND

Fire fighter trainers and simulators are used to train fire fighters and other individuals, including in some cases members of the general public, in proper firefighting techniques. Such trainers and simulators may provide a simulated but realistic firefighting environment by displaying simulated flames that can react to actual or simulated extinguishants directed at the display. Some types of trainers and simulators may utilize thermal sources, such as open flames or resistive heaters.

SUMMARY

In one embodiment, the invention is a system including an imaging device having a first image capture device configured to detect longwave infrared electromagnetic radiation and a second image capture device configured to detect near infrared electromagnetic radiation. The system further includes a display configured to display a visible representation of the detected infrared longwave electromagnetic radiation and the detected near infrared electromagnetic radiation.

DETAILED DESCRIPTION

Figure 1:
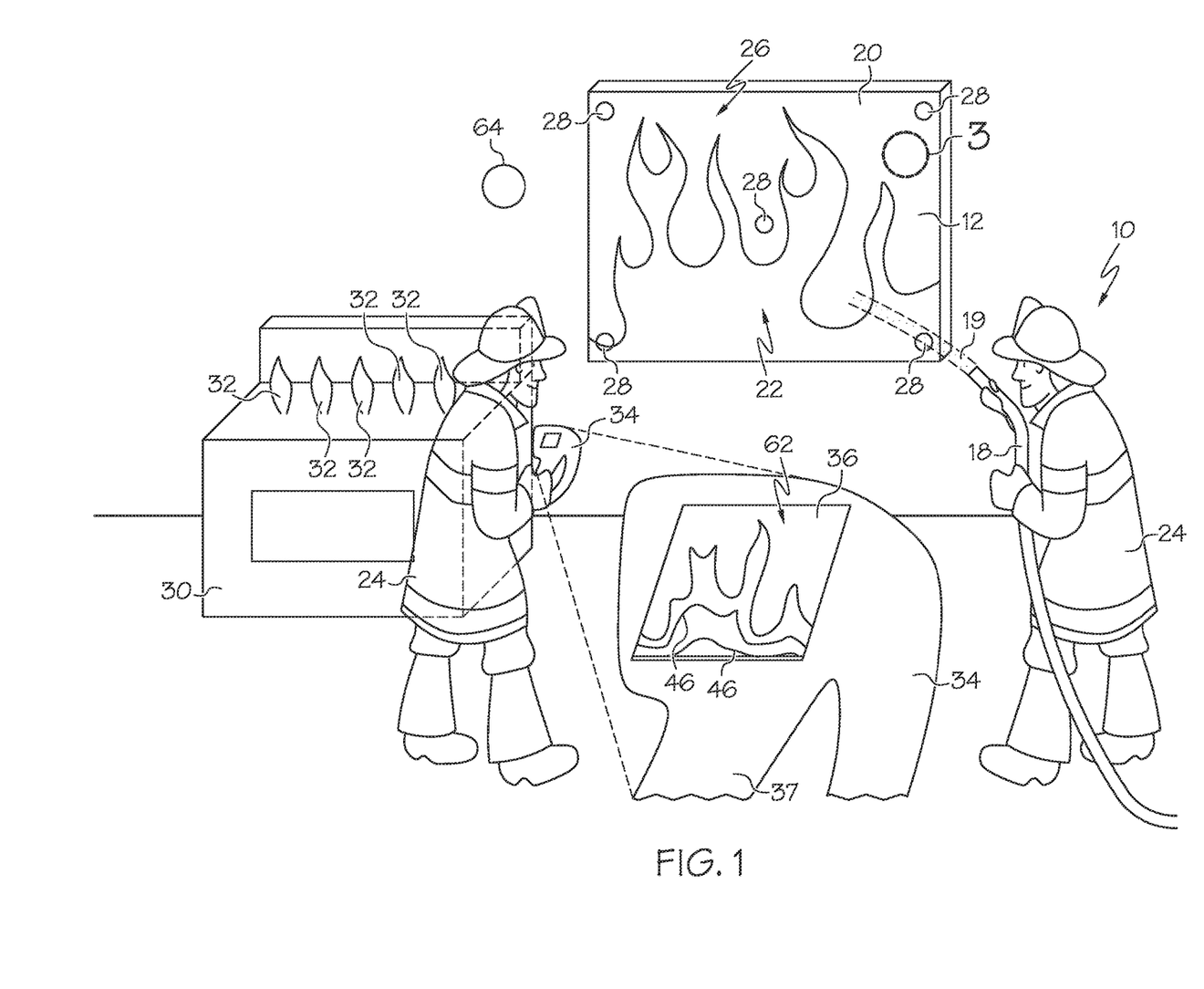
FIG. 1 is a schematic view of one embodiment of a fire fighter training system utilizing an imaging device, a display device and a prop.
Figure 2:
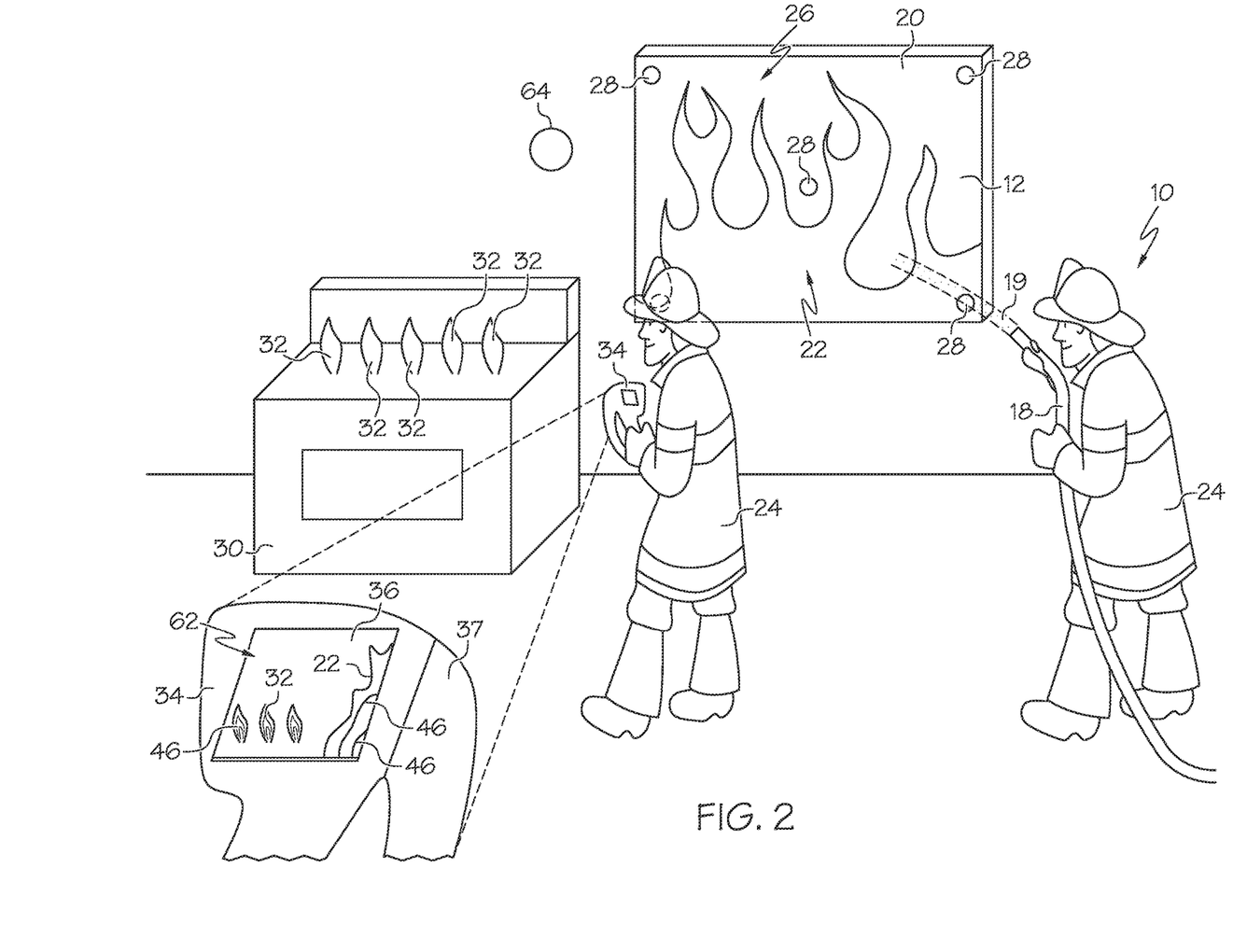
FIG. 2 is a schematic view of the system of FIG. 1, with the imaging device aimed differently.
Figure 3:
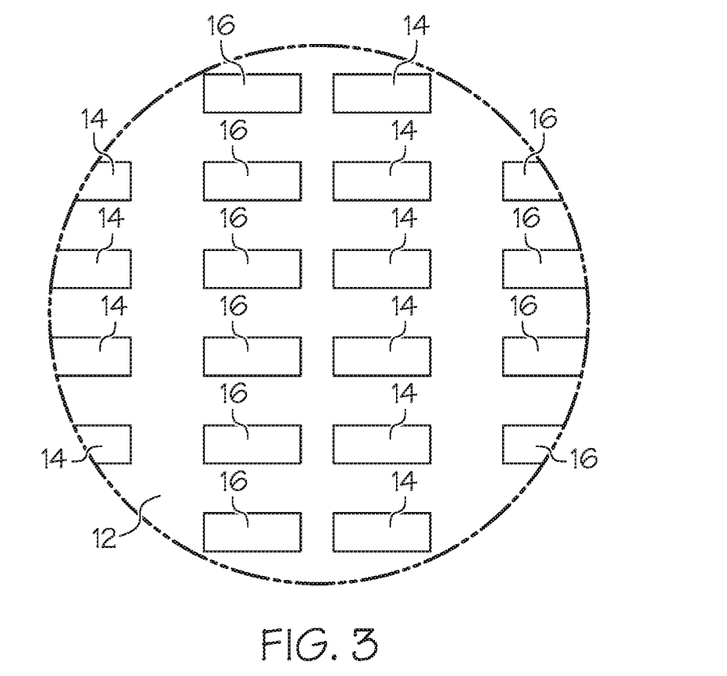
FIG. 3 is an enlarged view of a portion of the display device shown in FIG. 1, illustrating visible light emitters and infrared light (IR) emitters of the display device.

As shown in FIGS. 1 and 2, in one embodiment a training system, generally designated 10, includes a display, processing, sensing and control device 12 (termed a "display device" 12 herein). The display device 12 may be configured to emit both visible light and infrared (IR) electromagnetic radiation in patterns to simulate flames or other hazardous conditions, as will be described in greater detail below. As shown in FIG. 3 the display device 12 may include a plurality or an array of visible light emitters 14 and plurality or an array of IR emitters 16. In the embodiment shown in FIG. 3 each visible light emitter 14 is positioned adjacent to a corresponding IR emitter 16 such that there is a corresponding IR emitter 16 for each visible light emitter 14. However the visible light emitters 14 and IR emitters 16 may be arranged in any of a wide variety of patterns, arrangements and layouts, and the emitters 14, 16 may not necessarily be arranged in arrays or in a one-to-one correspondence. In addition, the display device 12 can be configured to emit visible light and IR radiation by a variety of other structures and methods.

Visible light (e.g. emitted by the visible light emitters 14) can be considered to include the portion of the electromagnetic spectrum that is visible to the human eye, in one case having a wavelength of between about 390 nm and about 700 nm. In one embodiment, the visible light emitters 14 may be light emitting diodes (LED) or organic LEDs (OLEDs) or the like, although other technologies may be utilized such as, for example, digital light processing light sources. IR radiation typically is in the range of from about 3 GHz to about 400 THz, but in one case the IR radiation emitted by the display device 12/visible IR emitters 16 is light or radiation within the near-infrared (NIR) spectrum, having a wavelength of between about 700 nm to about 2500 nm in one case, and more specifically about 940 nm. The IR emitters 16 can take any of a variety of forms, such as an infrared LED.

The display device 12 may be configured to be used in conjunction with real and/or simulated fire extinguishant devices or systems 18 that expel or project a real or simulated extinguishant, as will be described in greater detail below. In cases where the display device 12 is designed for use with real extinguishants 19, such as water, the display device 12 should be configured for use therewith, such as being sufficiently fluid-tight and/or able to resist forces applied during use (e.g. withstand pressurized liquid streams in some cases). In certain cases then the visible light emitters 14 and/or IR emitters 16 may also be designed and configured to be able to withstand exposure to a certain amount of fluid, liquid (e.g. water) and/or pressure.

Referring back to FIGS. 1 and 2, in one embodiment the display device 12 includes a generally clear or transparent protective screen 20 forming or positioned on a front surface thereof which can be made of, for example, glass, polymers (including polycarbonate), etc. The protective screen 20 may be made of a particularly durable material that can withstand relatively high fluid pressures associated with extinguishants 19 used in actual or simulated firefighting. The display device 12 may also include or be connected to a controller (not illustrated) which can take any of a wide variety of forms, including an application specific integrated circuit (ASIC), an electronic circuit, a processor (shared, dedicated, or group), a computer and/or memory that can execute one or more software or firmware programs, a combinational logic circuit, or other suitable components that provide the functionality as described herein. The controller of the display device 12 may receive and process inputs and provide outputs, including an output which may control the emitters 14, 16 to create a dynamic visible image 22 which can be generated by the visible light emitters 14 and is projected or displayed by the display device 12.

The display device 12 may generate and display the visible image 22 which a user/trainee 24, such as a fire fighter, is able to view with the naked eye. For example, in the embodiment as shown in FIGS. 1 and 2, the visible image 22 is a fire. However the visible image 22 can take any of a variety of forms, including smoke, flame, or other hazardous conditions in one case, displayed in a dynamic fashion to mimic a real hazardous condition. The visible light emitters 14 may be controlled by the controller to produce the visible image 22 upon the display device 12.

The IR emitters 16 may also be operated to produce an IR image that in some cases corresponds to the visible image 22 generated by the visible light emitters 14. The IR image may not correspond exactly to the visible image, but may be related thereto. For example, the IR image may be an image that mimics the heat signature of a flame that is shown in the visible image 22 and/or may present only hotter portions of the visible image 22 (i.e. located near a base of the flame image 22), or show ambient heat created by a fire that extends beyond the visible image 22. The IR image emitted by the display device 12 may not be directly visually detectable by the trainee 24 or other human user by the naked eye.

The display device 12 may be designed for use in conjunction with an extinguishant system 18 which can be used by a trainee 24 (or, in the case of FIGS. 1 and 2, a helper or supplemental trainee 24) to spray/project a real and/or simulated extinguishant 19. In one embodiment, the extinguishant system 18 sprays extinguishant 19 in the form of liquid water at pressures the same as or comparable to those provided by fire hydrants, pump trucks or the like using fire fighter handlines to provide a realistic training experience. Alternatively, the extinguishant system 18 may also or instead spray extinguishants 19 in the form of solids (such as chemical powder), liquids (such as water, foam, or combinations thereof) or gases (such as inert gases including $CO_2$) of various forms. In another embodiment, the extinguishant system 18 also or instead emits an extinguishant 19 in the form of a directed signal that is not manually detectable by the user 24 (i.e. may not have any noticeable mass), which can be visible or not visible by the user 24, such as electromagnetic waves (more particularly, emissions in the IR frequency, lasers) or the like.

The display device 12 may include a sensor system 26 integrated therein or coupled thereto to sense an extinguishant 19 sprayed or directed at the display device 12. The sensor system 26 may include one or more sensors 28 spaced about the front surface of the associated display device 12. The sensors 28 may in one case be temperature sensors, such as thermistors, that react to differing temperatures provided by conduction and/or convection of the extinguishant 19. However, the sensors 28 may take any of a wide variety of other forms, including nearly any device or transducer having physical properties that change when an external stimulus, such as a simulated, actual or virtual extinguishant, is applied to the sensor 28, and/or that can otherwise sense the extinguishant 19.

The output of each sensor 28, such as nature and direction of the sensed extinguishant 19, volume of application of the extinguishant 19, and timing of application of the extinguishant 19, the manner of application of the extinguishant 19, etc. may be provided to the controller of the display device 12 or to a remote controller. For example, proper firefighting technique, such as where extinguishant 19 is aimed at the proper locations for the proper duration and in proper methods, can cause the controller to reduce the size of the visible image 22 and the corresponding IR image, or cause the visible image 22 and the corresponding IR image to grow at a reduced rate. Conversely, relatively poor firefighting technique (i.e. where extinguishant 19 is not aimed at the proper locations or for improper durations or in improper methods) can cause the controller to increase the size of the visible image 22 and the corresponding IR image, or cause the visible image 22 and the corresponding IR image to grow at an increased rate. Further details relating to the display device 12 and its operation can be found in U.S. patent application Ser. No. 14/487,831 entitled FIRE FIGHTING TRAINING SYSTEM WITH INTEGRATED EXTINGUISHANT SENSOR filed on Sep. 16, 2014, the entire contents of which are hereby incorporated by reference.

The system 10 can also include or utilize one or more props 30 which are or are representations of household items or other items expected to be encountered during actual firefighting. Thus the prop 30 in FIGS. 1 and 2 takes the form of a stove emitting actual burning flames 32 fueled by a fuel source to provide a realistic training environment, where the flames 32 naturally emit heat and LWIR radiation.

Figure 4:
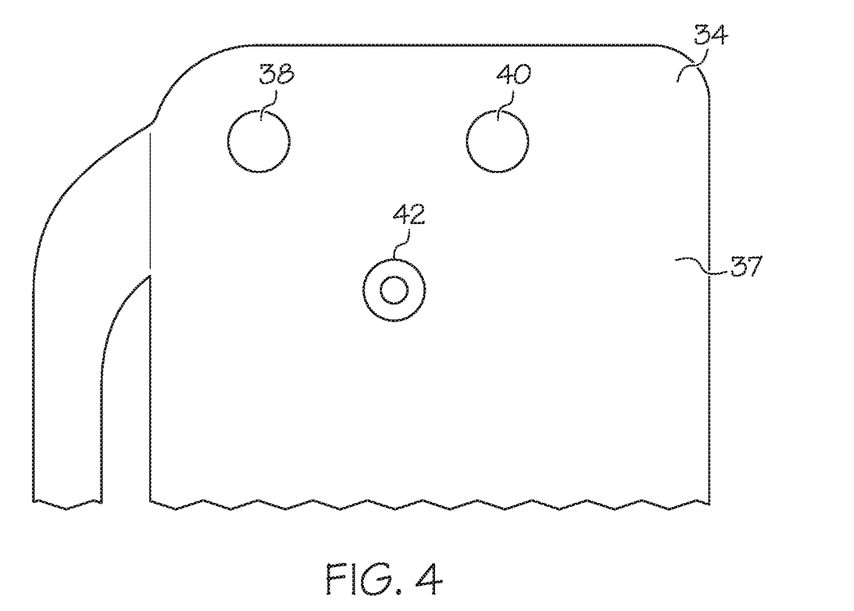
FIG. 4 is a back view of the imaging device of FIG. 1.

The system 10 can include or be utilized with an imaging device 34 including a controller 35 and an outer casing or housing 37, where the imaging device 34 can be used in conjunction with and/or separate from the display device 12. In one case the imaging device 34 is manually carryable and includes an output, display screen or display 36 which displays an output thereon that can be visually detected by a user or trainee 24. With reference to FIG. 4, the imaging device 34 can includes two sensors, cameras or image capture devices 38, 40 positioned in the casing 37 and having portions on a back side thereof, opposite the display 36, where in one case each image capture device 38, 40 includes its own aperture for receiving electromagnetic radiation and has its own lens.

The first image capture device 38 may be configured to capture images or radiation at a first range of wavelengths, such as longwave-infrared (LWIR) radiation in one case, which is referred to as a traditional thermal signature and can have wavelength of between about 8 μm (micrometer) and about 15 μm (micrometer). The first image capture device 38 may also capture the thermal signature of objects that reflect light in the LWIR spectrum such as, for example, humans, animals, and inanimate objects such as furniture. The second image capture device 40 may be configured to capture images in the IR spectrum (and more specifically, NIR spectrum) which can be referred to as IR images. It should be understood that most conventional thermal imaging cameras are not able to capture light in the NIR spectrum. Thus the imaging device 34 may include at least this additional functionality beyond that provided by conventional thermal imaging cameras.

Conventional glass lenses may not be desired to be used in the first 38 and second 40 image capture devices since conventional glass can reflect thermal radiation rather than allowing the thermal radiation to pass through. Thus the first and/or second image capture devices 38, 40, and more particularly their lenses, can be made of or include materials that do not reflect the desired radiation, including but not limited to germanium (Ge), chalcogenide glass, zinc selenide (ZnSe) and zinc sulfide (ZnS).

In order to identify or isolate light of the intended NIR wavelength, an optical filter may be included as part of the second image capture device 40, and polychromatic light from the scene can be passed through the optical filter and reach the second image capture device 40 as monochromatic light. This monochromatic light may occupy a narrow band of wavelengths so that only the intended wavelengths of light will reach the second image capture device 40. This may be achieved by using an optical bandpass filter with a center frequency at a desired NIR wavelength, such as 940 nm. One such filter may be constructed of an optical glass substrate with a metal or dielectric coating.

The imaging device 34 may also include an emitting device 42 that can be manually or automatically controlled or activated to emit a visible light output, such as a laser. The emitting device 42 may be used to direct a laser beam or other visible output to or along a target, such as the display 12, to provide feedback and guide the user 24 in correctly aiming the imaging device 34.

The imaging device 34 may thus receive radiation inputs from two different spectrum (LWIR radiation and NIR radiation in one case) through the first 38 and second 40 image capture devices, respectively, and through the controller 35 display both received/processed outputs in a combined/overlaid manner on the display 36 of the imaging device 34. More particularly, the imaging device 34 can be configured to generate a base image 48 based upon input LWIR radiation detected by the first image capture device 38, and augment/complement that base image 48 with input (IR radiation) detected by the second image capture device 40. In one case, the base image 48 generated based upon the received LWIR radiation may be displayed with contouring lines 46 or other indicia that be used to represent regions of varying temperature within the base image 48. In other words, the contouring lines 46 may represent isotherms and used to represent hotter and cooler portions of the fire or heat represented by the base image 48.

Similarly, images based upon IR radiation may be displayed with contouring lines 46 to mimic the base image 48 and thereby simulate the output of a traditional thermal imaging camera. The imaging device 34 may further process that data received from the second image capture device 40 to better visually represent the received data as a data signature that appears to have been captured by a LWIR camera observing a heated object, even though that object may not be present in its displayed form within the scene captured by the imaging device 34.

Figure 5:
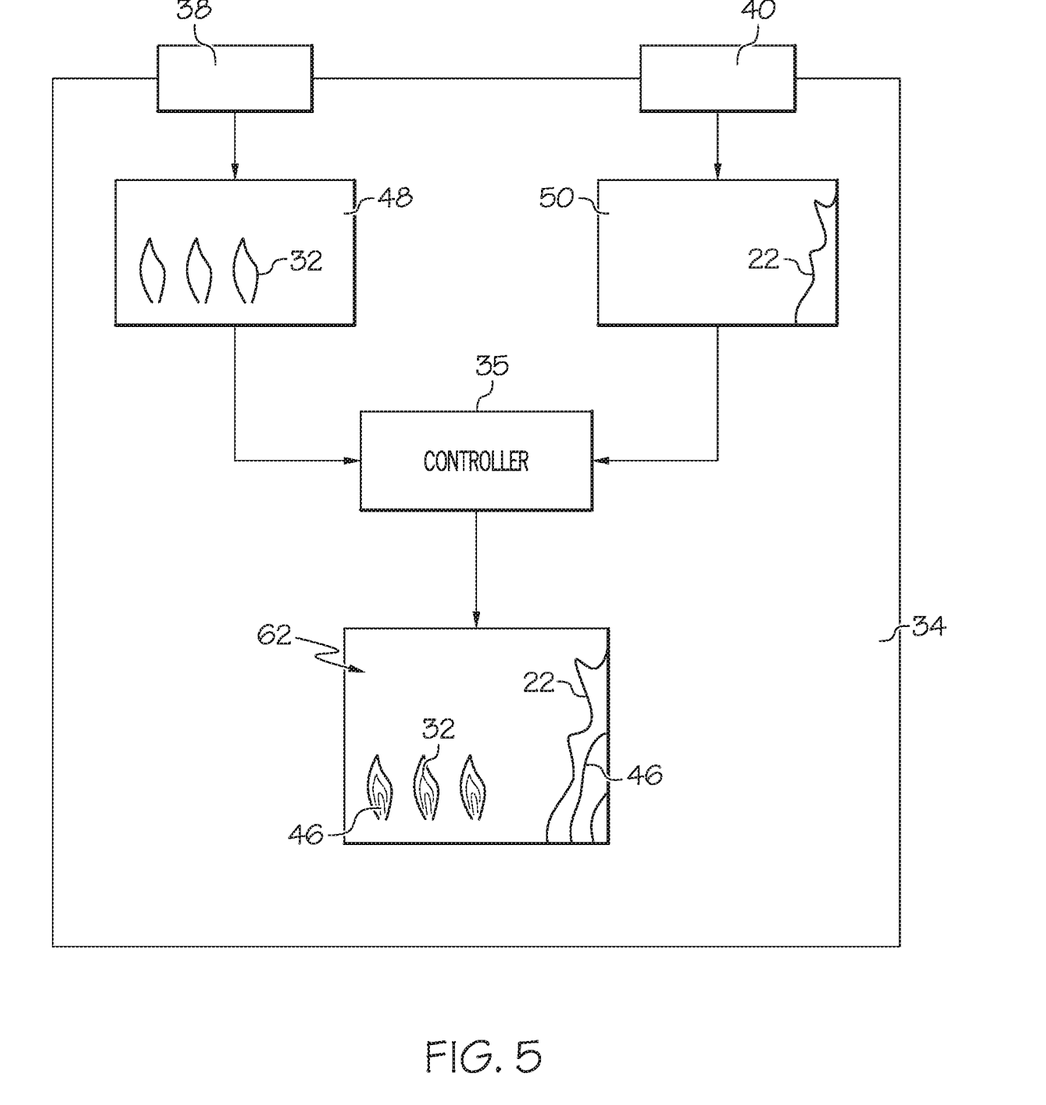
FIG. 5 is a block diagram schematic of the imaging device of FIG. 1.

FIG. 5 is a block schematic diagram of the imaging device 34 receiving images as shown in FIG. 2. The controller 35 receives a first or base image 48 captured by the first image capture device 38 and a second image 50 captured by the second image capture device 40. As noted above, in one case the first image capture device 38 captures light in the LWIR spectrum, and in this case is unable to capture the NIR radiation emitted by the IR emitters 16 of the display device 12. Thus no image from the display device 12 is sensed in the base image 48, even though the visible image 20 of the display device 12 may be in the field of view of the first image capture device 38. However a LWIR image from the flames 32 is captured in the base image 48.

The second image 50 is based upon radiation captured by the second image capture device 40 (radiation in the NIR spectrum). Thus, the second image 50 is based upon radiation within the NIR spectrum, e.g. from the IR emitters 16 of the display device 20, but the second image 50 is not based upon any LWIR radiation, such as that emitted by the flames 32, even though the flames 32 may be in the field of view of the second image capture device 40. The controller 35 may remove, add, or otherwise manipulate data from the captured images 48, 50 such that the controller 35 can extract only the meaningful information that is intended for display by the display 36.

The controller 35 can include control logic for performing various image processing and computer vision algorithms to generate the augmented/composite image 62. Thus the augmented/composite image 62 can include the first image 48 overlaid with the second image 50, with one or each being augmented with isotherm lines 46 or the like if desired. The augmented/composite image 62 may include a naturally generated thermal signatures/isotherm lines for the first image 48, and simulated thermal signature/isotherm lines for the second image 50. Processing of data from the images 48 and/or 50 may include noise reduction or thresholding algorithms, smoothing or blending algorithms, heat transfer simulations, contour and closed loop polygon finding algorithms, or object recognition algorithms using trained cascade classifiers.

The processed data originating from the first 38 and second 40 image capture devices may be selectively combined by controller 35 such that the data will appear to have originated from a single LWIR camera. This merging process may include parallax error adjustments and field of view adjustments using, for example, perspective transformation algorithms. The merged scene may then be further processed by the controller 35 to form a meaningful falsely colorized augmented image that will appear to be a uniform thermal scene with both real and simulated thermal data.

Since the imaging device 34 is able to detect and display LWIR radiation through the first image capture device 38, the imaging device 34 can be used like a traditional thermal camera to sense, detect and display thermal images. For example the imaging device 34 can be used by a user 24 to locate heat sources, such as fires, including in situations of limited visibility such as, for example, heavy smoke or darkness. Thus when a user uses the imaging device 34, the output 36 of the imaging device 34 corresponds with that expected of a normal thermal camera; for example, items known to be hot, such as the flames 32 of FIG. 2, are shown to be hot by the imaging device 34.

However, use of the second image capture device 40 in conjunction with the display 12, enables the system 10 to mimic the appearance of heat when the heat is not actually present (or at least is not present in the amounts suggested by the imaging device 34). As shown in FIG. 2, the user 24 has directed or aimed the imaging device 34 such that (as compared to FIG. 1) the imaging device 34 is no longer directly aimed at the display device 12. In this case then the real flames 32 emitted by the prop 30 are visible on the display screen 36 as shown in FIG. 2, along with the image generated by the display device 12. Thus the system 10 enables realistic training in that display 12 not only visually displays flames 22, but provides an output that simulates, on the imaging device 34, a thermal signal that corresponds to flames where no real flames are present. In addition, both the visual image 22 (on the display device 12) and thermal image (on the imaging device 34) of the flames are dynamic and respond to firefighting technique to provide an even more realistic training exercise.

With reference to FIGS. 1 and 2, the training system 10 may also include or be used in conjunction with one or more IR emitters or beacons 64. The beacon 64 may be positioned on or adjacent to the display screen 12 so that the beacon 64 can be within an expected field of view (FOV) of the imaging device 34, although the beacon 64 can also be located at various other locations within the training/simulation space. The beacon 64 may in one case emit light within the IR, and more specifically, NIR spectrum. The beacon 64 may be configured to emit radiation that is pulsed or modulated between an on state and an off state to indicate information about a specific real or simulated heat source, fire, or other hazardous condition monitored by the imaging device 34.

In the embodiment as shown in FIGS. 1 and 2, the beacon 64 may transmit information about the fire shown in the visible image 22 and/or emitted by the prop 30. The information that may be communicated by the beacon 64 includes, for example, the temperature and the size of the heat source, type of fire/fuel being burned, etc. The output of the beacon 64 can be processed by the imaging device 34 and/or controllers/processors to which the imaging device 34 is connected. In addition, data from the beacon 64 which is processed could be displayed on the display 34, such as temperature and size of the heat source in graphic or text form, etc.

In one case, the switching frequency of the beacon 64 may be desired to not exceed one-half a frame rate of the imaging device 34, as required by the Nyquist-Shannon sampling theorem. Additionally, it should also be appreciated that each beacon 64 may produce a designed pulsing pattern at fixed times for purposes of synchronization between each beacon 64 and the imaging device 34.

Figure 6:
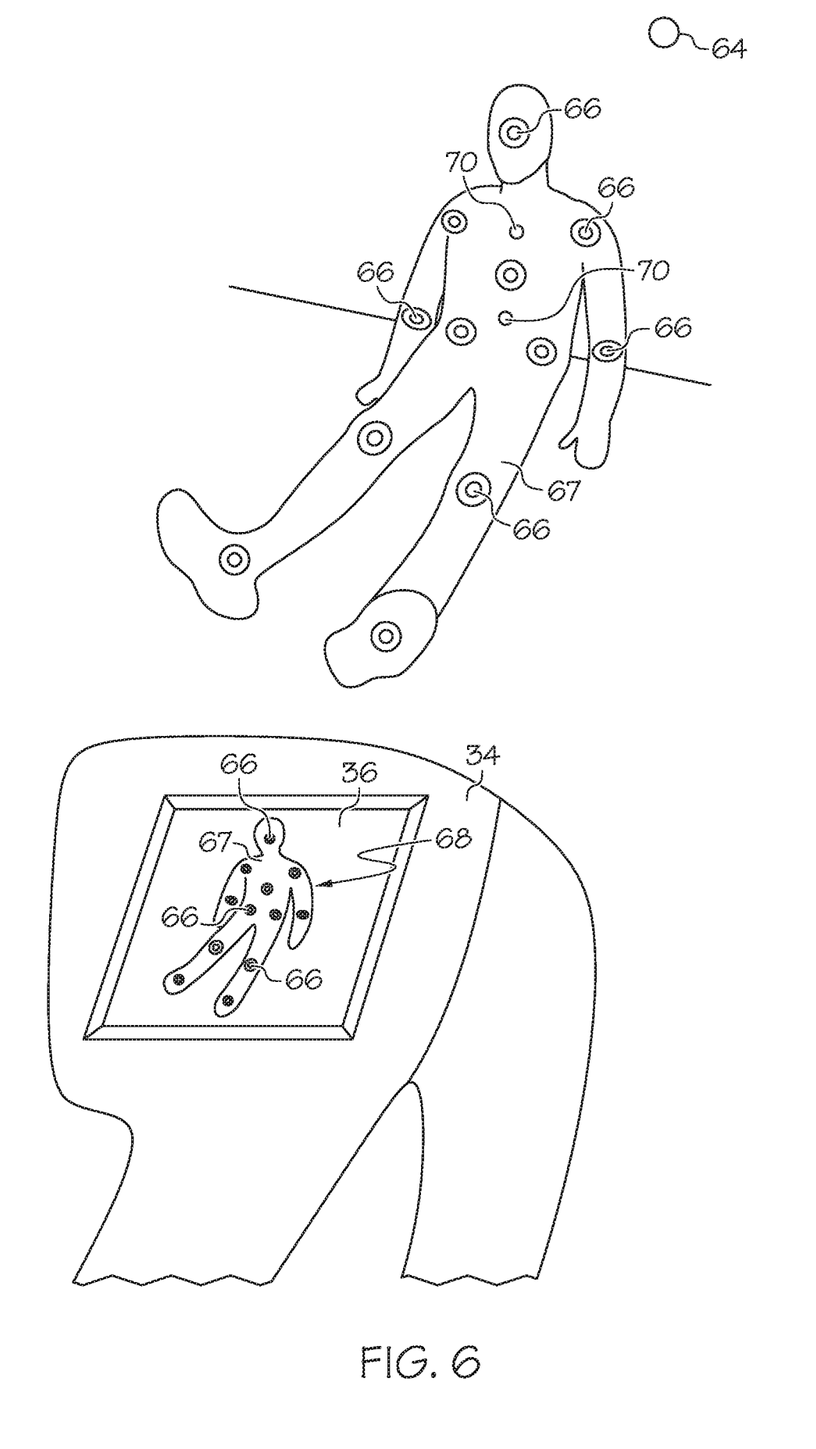
FIG. 6 is a schematic view of another embodiment of a fire fighter training system, including a prop and a imaging device.

FIG. 6 illustrates another embodiment where a beacon 64 may be associated with or used in conjunction with a set of reflective markers 66. In one embodiment, the markers 66 are passive elements that are coated with a retroreflective material, and infrared or other light or radiation generated from the imaging device 34, beacon 64, (or from another source) is reflected off of the markers 66 and captured by the imaging device 34. Alternatively, in another embodiment, the markers 66 may be active elements that emit light in the NIR spectrum or other radiation, and in this case the beacon 64 may not be needed.

The markers 66 may be arranged in a specific pattern so as to form a shape or outline of a particular object, such as an object that may be encountered in firefighter or first responder activities. For example, in the embodiment as shown in FIG. 6, the markers 66 are arranged on a dummy or mannequin so as to thereby collectively form a prop 67. In one embodiment, the markers 66 may be arranged along portions of a mannequin that represent the joints (i.e., knees, elbows, etc.) of a human being, such that their image, as viewed by the imaging device 34, and more particularly due to data captured by the second image capture device 40, appears in a human-like shape. Thus, the trainee 24 (FIGS. 1 and 2) may be able to view an image 68 upon the display 36 of the imaging device 34 that mimics or resembles a human. However, the markers 66 may not necessarily be positioned in this manner or indeed need not be positioned on a dummy or mannequin. The markers 66 may be arranged in various patterns to form various shapes and props besides human shapes such as, for example, appliances, furniture, equipment, etc.

The prop 67 may also include a sensor system integrated therein or coupled thereto, including one or more sensors 70, to sense an extinguishant sprayed or directed at the prop 67. The sensors 70 can be the same as or similar to the sensors 28 described above, and may be temperature sensors, such as thermistors, that may react to differing temperatures provided by conduction and/or convection of an extinguishant 19. However, the sensors 70 may take any of a wide variety of other forms, including nearly any device that may detect a simulated, actual or virtual extinguishant, applied to the sensor 70.

In one embodiment, a beacon 64 may be used in conjunction with the prop 67 and may provide an output that can be sensed by the imaging device 34 that is indicative of the temperature or other property of the associated prop 67. For example, the beacon 64 may send a signal that indicates the prop 67 is at a temperature that is customary for a live human (i.e., 98.6° F. or 37° C.). However, after a specified period of time has lapsed, the beacon 64 may emit a signal indicating that the prop 67 has changed in temperature and is now at a temperature of a human who has expired. The beacon 64 may also transmit other information relating to the prop 67 (or other adjacent props 67) such as, for example, the identity of the prop 67, its size/mass, fuel source, and fire type.

In one embodiment, one or more inertial measurement units (IMUs) and magnetic proximity sensors (not illustrated) may be placed within or directly adjacent to the prop 67. The IMU and the magnetic proximity sensors may be in wireless communication with the controller 35 of the imaging device 34 through a wireless network. In some testing situations, the prop 67 may be obstructed from view or not be within the FOV of the imaging device 34. The IMUs and the magnetic proximity sensors may indicate both a distance as well as a relative position vector between the prop 67 and the imaging device 34. Accordingly, the IMUs and magnetic proximity sensors may be used to add persistence to the prop 67. Thus, the imaging device 34 may be able to maintain the image of the prop 67 upon the display 36 of the imaging device 34, even during conditions of relatively low and no visibility.

Figure 7:
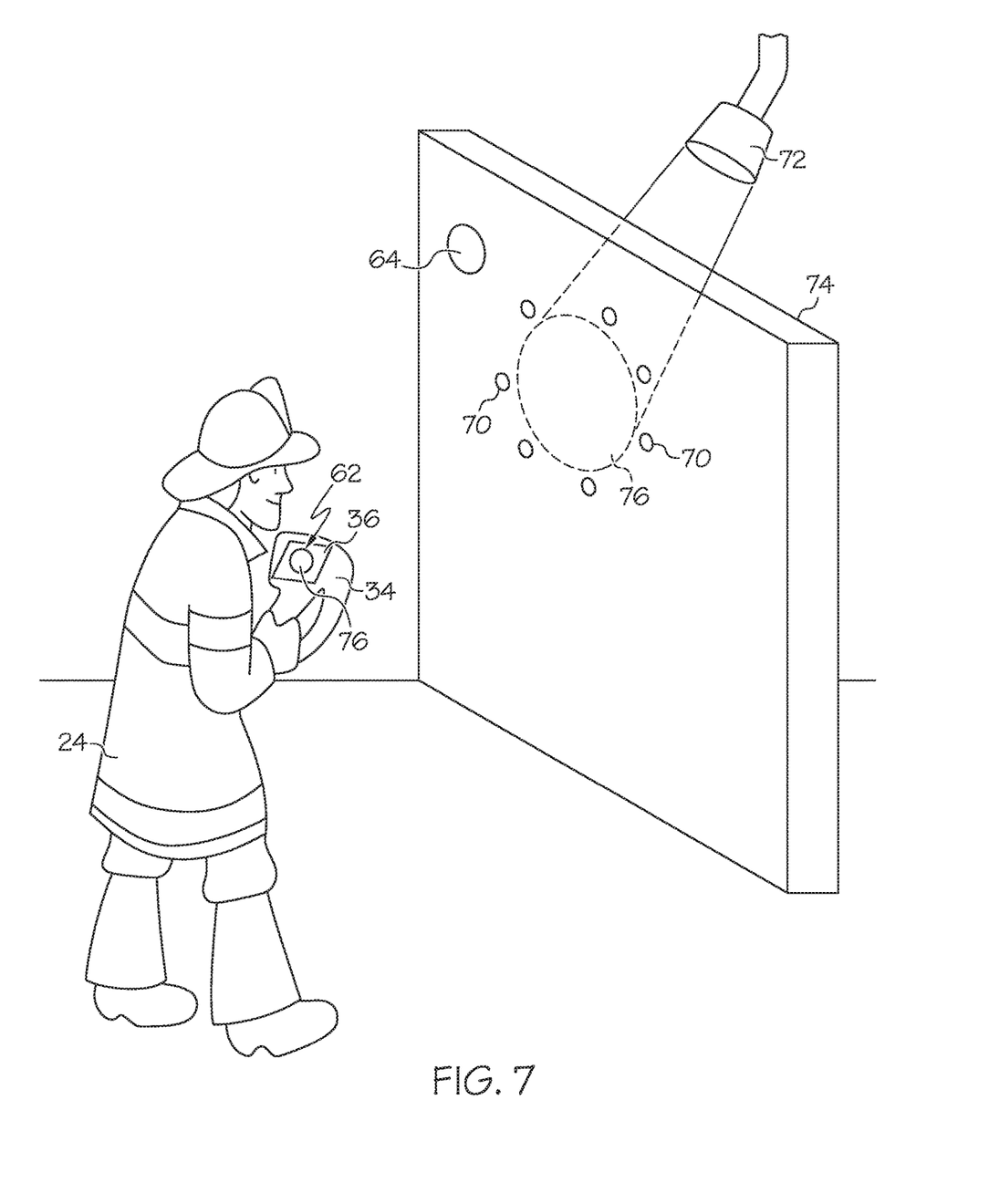
FIG. 7 is a schematic view of yet another fire fighter training system, including a beacon and an imaging device.

FIG. 7 illustrates another embodiment where a projector 72 may be used to emit IR/NIR light/radiation upon an object 74, such as a wall or a screen in the illustrated embodiment. The projector 72 may be used to generate an image 76 (which may be read as a thermal image by the imaging device 34) upon the wall or object 74. In one embodiment, the image 76 may simulate hidden smoke, flame, or other hazardous conditions that may be trapped behind the object 74, and are therefore are not typically visible to the trainee 24. In one embodiment, the projector 72 may be used to direct light upon the object 74 in a specific pattern. For example, the projector 72 may be used to direct light in the shape of a flame on a wall 74 to simulate a hidden fire behind the wall 74, although FIG. 7 illustrates an image 76 in a simple circular pattern. As can be seen screen 36 of the imaging device 34 may display an image corresponding to the image output by the projector 72, and in this manner the projector 72 can be used to provide the appearance of heat to provide realistic training environments.

As seen in FIG. 7, a beacon 64 may be positioned at or adjacent to the image 76, and within the FOV of the imaging device 34. Similar to the beacons 64 illustrated in FIGS. 1, 2 and 6 and described above, the beacon 64 of FIG. 7 may be pulsed or modulated between an on and off state to transmit information about the image 76. A sensor 70 or plurality of sensors 70, may be integrated therein or coupled to the wall/object 74 for sensing an extinguishant 19.

It should be understood that the various embodiments and systems described herein can be used together in a complementary manner. For example, the display device 12, prop(s) 30 and/or 67 and/or projector 72 can all be used in the same training space to provide a realistic and multi-faceted training space/exercise. The projector(s) 72 can also be used in conjunction with and/or aimed at the display device(s) 12 and/or prop(s) 30, 67. Alternately, the display device 12, prop(s) 30, 67 and/or projector 72 can be used alone, or in various combinations.

Having described the invention in detail and by reference to the various embodiments, it should be understood that modifications and variations thereof are possible without departing from the scope of the claims of the present application.

What is claimed is:

1. A system comprising an imaging device including:
    a first image capture device configured to detect longwave infrared electromagnetic radiation;
    a second image capture device configured to detect near infrared electromagnetic radiation, wherein the first image capture device includes an aperture that is separate and apart from an aperture of the second image capture device;

a display configured to display a visible representation of the detected infrared longwave electromagnetic radiation and the detected near infrared electromagnetic radiation; and an imaging device controller operatively coupled to the first image capture device and to the second image capture device, wherein the imaging device controller is configured to create a composite image for display on said display, wherein said composite image is based upon an output of said first image capture device and said second image capture device, and wherein the imaging device is configured for use with a display device that is configured to display an image with visible light and an image with near infrared electromagnetic radiation.

2. The system of claim 1 wherein the imaging device controller is configured to combine and process data from the first image capture device and the second image capture device so that the visible representation displays both real and simulated thermal image data.

3. The system of claim 1 wherein said imaging device is manually carryable and includes a casing, and wherein said first image capture device and said second image capture device are both positioned in said casing.

4. The system of claim 1 further comprising the display device, wherein said display device is configured to display an image with visible light and an image with near infrared electromagnetic radiation.

5. The system of claim 4 wherein the display device includes a sensor configured to detect a real or a simulated extinguishant directed at the display device.

6. The system of claim 5 wherein the sensor is operatively coupled to a display device controller that is also operatively coupled to the display device, and wherein the display device controller is configured to adjust at least one of the visible light image or the near infrared electromagnetic radiation image based upon the output of the sensor.

7. The system of claim 4 wherein the near infrared electromagnetic radiation image is related to the visible image.

8. The system of claim 4 wherein the visible image is an image of a fire or flame, and wherein the near infrared electromagnetic radiation image represents a heat signature of the fire or flame.

9. The system of claim 4 wherein the display device includes a plurality of light emitting elements and a plurality of near infrared electromagnetic radiation emitting elements that are operable independently of the light emitting elements.

10. The system of claim 1 wherein the imaging device is configured to receive and decode pulsed, encoded infrared signals.

11. The system of claim 1 further comprising a beacon configured to emit pulsed, encoded near infrared signals, and wherein the second image capture device is configured to receive and decode the pulsed, encoded near infrared signals.

12. The system of claim 1 wherein the imaging device is configured to receive near infrared radiation from near infrared emitting devices or from near infrared reflecting devices arranged in a manner to simulate an item or prop, process the received near infrared radiation and provide an output indicative of the item or prop.

13. The system of claim 1 further comprising a plurality of near infrared emitting devices or near infrared reflecting device arranged in a manner to simulate an item or prop.

14. The system of claim 1 further comprising a projector configured to emit a directed beam of near infrared radiation that is detectable by said second image capture device such that an image of the directed beam is displayable on the display.

15. The system of claim 1 wherein the longwave infrared electromagnetic radiation has a wavelength of between about 8 µm and about 15 µm and wherein the near infrared electromagnetic radiation has a wavelength of between about 700 nm and about 2500 nm.

16. system comprising an imaging device including:

a first image capture device configured to detect longwave infrared electromagnetic radiation;

a second image capture device configured to detect electromagnetic radiation other than longwave infrared electromagnetic radiation and that is invisible to the naked eye;

a display configured to display a visible representation of the electromagnetic radiation detected by the first image capture device and the electromagnetic radiation detected by the second image capture device, wherein the first image capture device includes an aperture that is separate and apart from an aperture of the second image capture device; and an imaging device controller operatively coupled to the first image capture device and to the second image capture device, wherein the imaging device controller is configured to create a composite image for display on said display, wherein said composite image is based upon an output of said first image capture device and said second image capture device, and wherein the imaging device is configured for use with a display device that is configured to display an image with visible light and an image with near infrared electromagnetic radiation.

17. A system comprising a display device including:

a visible light emitter configured to dynamically display a visible image of a fire or flame; and an infrared emitter configured to dynamically emit infrared radiation in a manner that corresponds to a heat signature of the displayed fire or flame, wherein the display device is configured for use with an imaging device having a first image capture device configured to detect longwave infrared electromagnetic radiation and a second image capture device configured to detect infrared electromagnetic radiation emitted by the infrared emitter, wherein the first image capture device includes an aperture that is separate and apart from an aperture of the second image capture device.

18. The system of claim 17 wherein the display device includes a sensor configured to detect a real or a simulated extinguishant directed at the display device.

19. The system of claim 18 wherein the sensor is operatively coupled to a display device controller that is also operatively coupled to the display device, and wherein the display device controller is configured to adjust at least one of the visible image or the infrared image based upon the output of the sensor.

20. The system of claim 17 wherein the infrared emitter is configured to dynamically emit near infrared radiation, and wherein the system further includes the imaging device including a first image capture device configured to detect longwave infrared electromagnetic radiation and a second image capture device configured to detect near infrared electromagnetic radiation emitted by the infrared emitter, wherein the imaging device includes a display configured to output a visible representation of the detected longwave infrared electromagnetic radiation and the detected near infrared electromagnetic radiation.

21. A simulated prop system comprising a plurality of infrared emitting or passive infrared reflecting devices arranged in a manner to simulate a dummy or mannequin, wherein the prop system is configured for use with an image capture device configured to infrared detect electromagnetic radiation such that electromagnetic radiation reflected or emitted by said dummy or mannequin is detectable by the image capture device and displayable to a user such that the dummy or mannequin is displayed in a human-like shape.

22. system comprising a display device including:
 a visible light emitter configured to emit visible light;
 an infrared emitter configured to emit infrared radiation; and
 a sensor operatively coupled to the visible light emitter and the infrared emitter configured to detect a real or a simulated extinguishant directed at the display device, wherein the display device is configured for use with an imaging device including an image capture device configured to detect infrared electromagnetic radiation emitted by the infrared emitter such that the infrared radiation emitted by the infrared emitter is detectable by the image capture device and displayable to a user.

23. The system of claim 22 wherein the visible light emitter is configured to display an image of a fire or a flame and wherein the infrared emitter configured to emit infrared radiation in the near infrared spectrum in a manner that corresponds to a heat signature of the fire or flame.

24. A system comprising a display device including:
 an infrared emitter or projector configured to emit or project radiation in the near infrared spectrum to generate a simulated thermal image which can be detected by an imaging device; and
 an imaging device including:
  a first image capture device configured to detect longwave infrared electromagnetic radiation;
  a second image capture device configured to detect near infrared electromagnetic radiation, wherein the first image capture device includes an aperture that is separate and apart from an aperture of the second image capture device; and
 an imaging device controller operatively coupled to the first image capture device and to the second image capture device, wherein the imaging device controller is configured to create a composite image for display on a display, wherein said composite image is based upon an output of said first image capture device and said second image capture device.

* * * * *

UNITED STATES PATENT AND TRADEMARK OFFICE
CERTIFICATE OF CORRECTION

| | | |
|---|---|---|
| PATENT NO. | : 10,507,346 B2 | Page 1 of 1 |
| APPLICATION NO. | : 15/487644 | |
| DATED | : December 17, 2019 | |
| INVENTOR(S) | : Brian P. Bradley, Michael P. Waterhouse and Daniel A. Goldman | |

It is certified that error appears in the above-identified patent and that said Letters Patent is hereby corrected as shown below:

In the Claims

In Claim 16, Column 10, Line 14, reads:
"16. system comprising an imaging device including:"
It should read:
-- 16. A system comprising an imaging device including: --

In Claim 22, Column 11, Line 15, reads:
"22. system comprising a display device including:"
It should read:
-- 22. A system comprising a display device including: --

Signed and Sealed this
Eleventh Day of February, 2020

Andrei Iancu
*Director of the United States Patent and Trademark Office*